Figure 1:
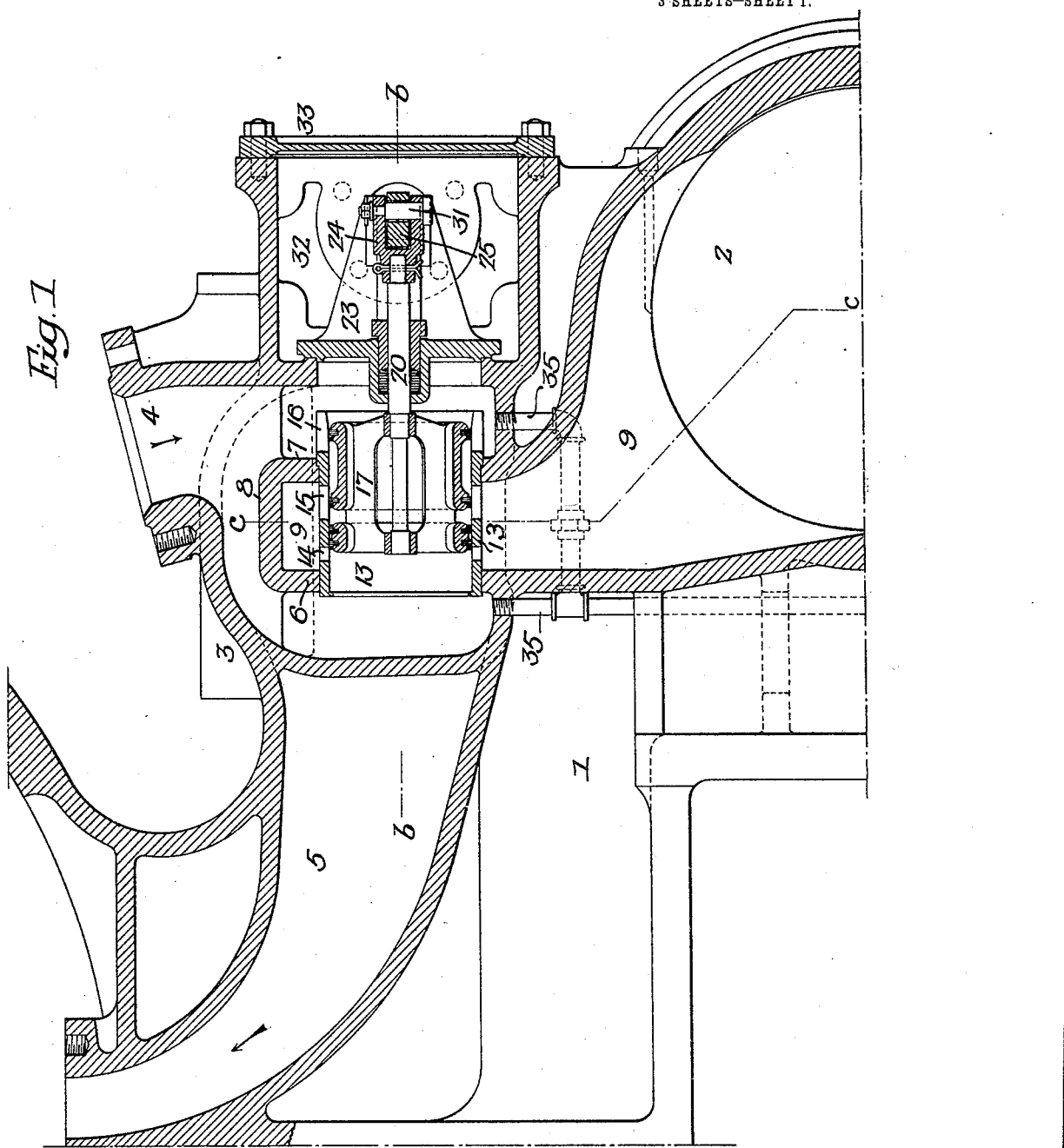

W. S. HODGES.
VALVE FOR LOCOMOTIVES.
APPLICATION FILED JUNE 18, 1912.

1,122,928.

Patented Dec. 29, 1914.

3 SHEETS—SHEET 1.

Witnesses—

Inventor—
William S. Hodges.
by his Attorneys—

W. S. HODGES.
VALVE FOR LOCOMOTIVES.
APPLICATION FILED JUNE 18, 1912.
1,122,928.
Patented Dec. 29, 1914.
3 SHEETS—SHEET 2.
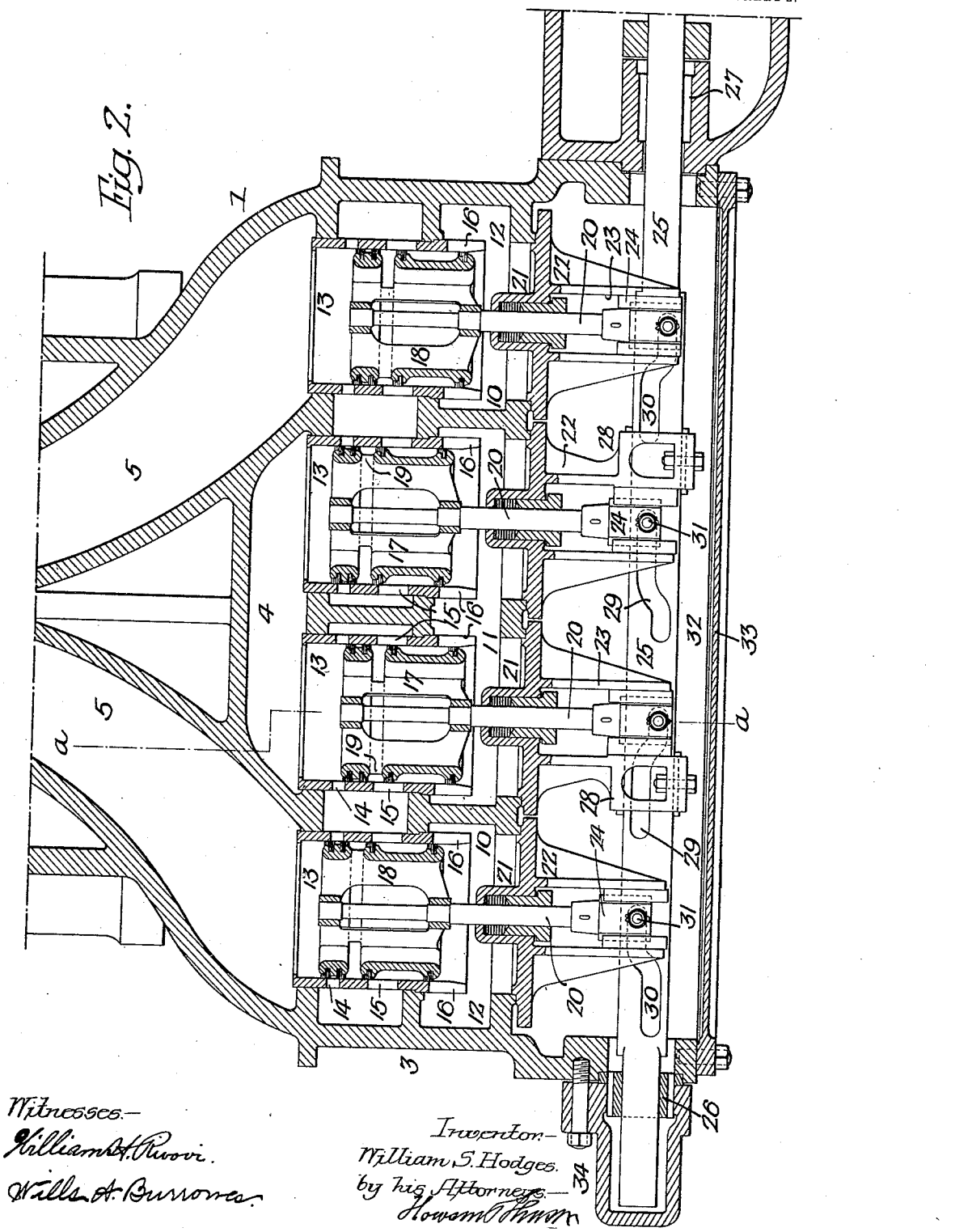

W. S. HODGES.
VALVE FOR LOCOMOTIVES.
APPLICATION FILED JUNE 18, 1912.
1,122,928.
Patented Dec. 29, 1914.
3 SHEETS—SHEET 3.
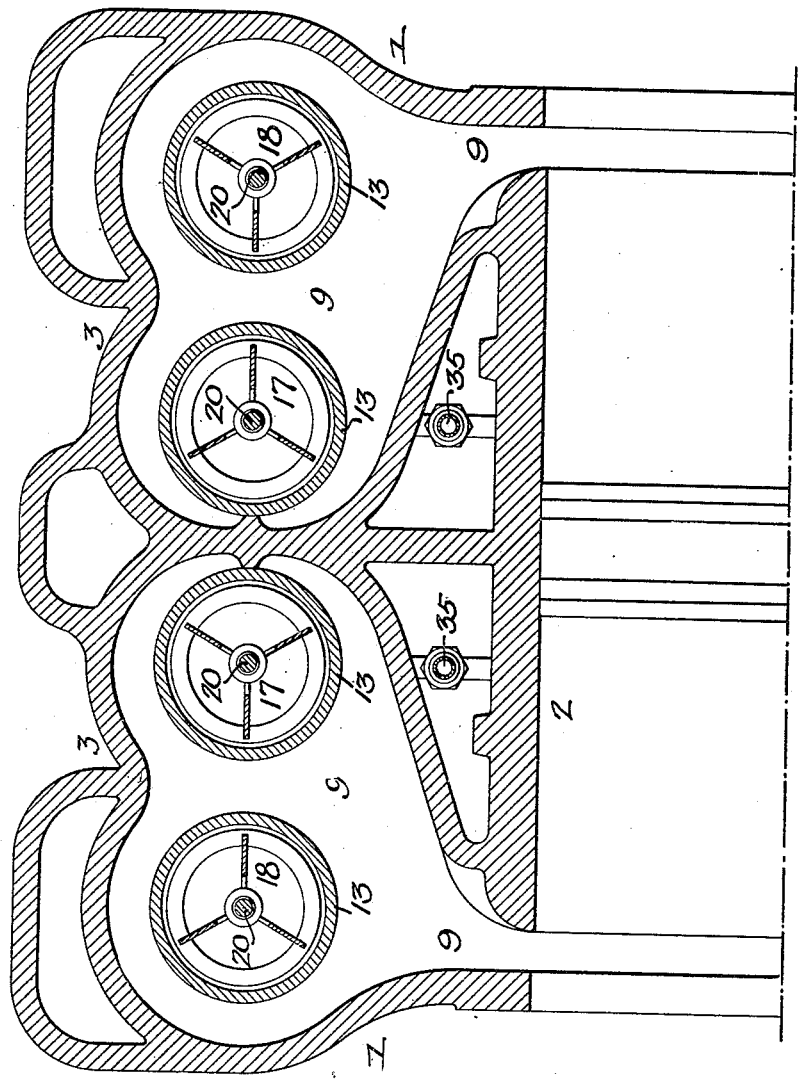

UNITED STATES PATENT OFFICE.

WILLIAM S. HODGES, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

VALVE FOR LOCOMOTIVES.

1,122,928.  Specification of Letters Patent.  Patented Dec. 29, 1914.

Application filed June 18, 1912. Serial No. 704,353.

*To all whom it may concern:*

Be it known that I, WILLIAM S. HODGES, a citizen of the United States, residing in Philadelphia, Pennsylvania, have invented certain Improvements in Valves for Locomotives, of which the following is a specification.

My invention relates to certain improvements in valves particularly adapted for use as inlet and exhaust valves for the steam cylinders of locomotives.

The object of my invention is to simplify the construction of valves of this type and to provide a valve which can be opened for the passage of a large quantity of steam with a comparatively small movement.

The invention also relates to certain details, which will be fully described hereinafter.

In the accompanying drawings:—Figure 1, is a vertical sectional view through a portion of a cylinder of a valve chest and the saddle of a locomotive; the section being taken on the line a—a, Fig. 2; Fig. 2, is a sectional plan view on the line b—b, Fig. 1, and Fig. 3, is a longitudinal sectional view on the line c—c, Fig. 1.

Referring to the drawings, 1 is the cylinder saddle at one side of a locomotive.

2 is the cylinder.

3 is the valve chest.

4 is the inlet passage leading to the valve chest and connected with the steam supply.

5 are the air exhaust passages communicating with the exhaust nozzle in the smoke box of the locomotive, in the present instance. These passages merge into a single passage at the smoke box.

6 and 7 are two vertical partitions spaced apart and connected at the top by a partition 8. These three partitions separate the inlet and exhaust passages from the passages 9 communicating with the cylinder near each end.

10 are the lateral partitions which separate the admission chambers 11 at the center from the exhaust chambers 12 at each end, in the present instance. In the partitions 6 and 7 are four cylindrical openings. Two in the admission chamber 11 and one in each exhaust chamber 12. Mounted in these openings and extending from one partition to the other are cylindrical casings 13; having ports communicating with the passages 9 leading to the cylinder 2. In each cylindrical casing are two ports 14 and 15; the port 15 being greater in length than the port 14. At one end of each cylindrical casing are projecting fingers 16, in the present instance.

17 are two cylindrical admission valves, adapted to their cylindrical casings 13, and 18 are two cylindrical exhaust valves, adapted to their cylindrical casings 13. The valves 17 have through passages so that they will be perfectly balanced and the ports 19 each aline with the ports 15 in the casing. The valves are so proportioned that when they are moved to allow steam to pass into the cylinder, both ports 14 and 15 are uncovered, as clearly shown in Fig. 2.

The construction is the same in the exhaust valves as in the admission valves, so that the area of the ports is materially increased; allowing for the free passage of either live steam or exhaust steam, and it will be noticed that when the ports are opened on the movement of the valve, there is a triple admission or a triple exhaust, as clearly shown in Fig. 2.

Secured to each valve is a rod 20, which passes through a stuffing box 21 in a cap 22. In the present instance, there are four caps, one opposite each valve, so that any one of the valves can be removed without disturbing the others. Projecting from each cap are two arms 22, having guides for the heads 24, secured to each rod 20. 25 is a reciprocating valve rod adapted to bearings 26 and 27 at each end of the chest and also adapted to guides 28 on two of the arms 22. In this valve rods are admission cam slots 29 and exhaust cam slots 30. On the heads 24 of the respective valves are pins 31 adapted to the said slots so that as the valve rod is reciprocated longitudinally, the valves are reciprocated at right angles to the movement of the valve rod, due to the form of the cam slots.

The valve rod 25 may be connected to the ordinary valve actuating mechanism of any standard design. The valve rod is located in a chamber 32 at the side of the valve chest and this chamber is closed by a cover 33; thus making a tight chamber, which is filled with lubricant so that the mechanism is working in oil at all times. The front end of the valve rod is covered by a cap 34, which retains the bearings 26 in place. The water of condensation is drained from the bottom of the valve chamber by pipes 35, as clearly shown in Fig. 1.

The operation is as follows:—In the present instance, there is a single admission valve and a single exhaust valve for controlling the admission and exhaust of steam at each end of the cylinder. The two admission valves are at the center of the valve chest and there is an exhaust valve at each end, in the present instance. The slots 29 and 30 in the valve rod 25 are so formed that when the admission valve, on one side, opens the ports, the exhaust valve on that side closes the ports, or vice versa, so that steam is admitted first to one end of the cylinder and exhausted from the other end of the cylinder when the valve rod is moved in one direction and when moved in the opposite direction, steam is admitted to the other end of the cylinder and exhausted from the opposite end. The exhaust slot 30 is preferably cut, as shown, so as to allow the valve to dwell in the open position longer than the admission valve and it will be understood that the form of the slots may vary under different conditions so that the exhaust remains practically unchanged, while the point of cut-off is altered.

By the above construction, I am enabled to materially increase the area of the ports without materially increasing the space occupied by the valves and as the valves are all duplicates, one of another, repairs can be readily made, and comparatively light operating mechanism may be used. While the port opening is the same as in some types of valves, the increase in area over these types is greatly augmented at short cut offs. Furthermore, by removing the front cover 33, access can be had to the valve rod and its connections and any one of the valves can be removed by first removing its cap 21.

I claim:

1. The combination of a valve chest having two partitions with openings therein; a cylindrical valve casing mounted in the openings in the two partitions, said valve casing having ports communicating with the passage between the partitions; a cylindrical valve mounted in the valve casing, said valve having a through passage; a port communicating with the through passage; and an annular passage at one side of the port so that on the reciprocation of the valve the port will be closed.

2. The combination of a valve chest having two partitions spaced apart; a cylindrical valve casing extending from one partition to the other and having two sets of ports, one set being of a greater length than the other; a cylindrical valve mounted in the valve casing, said valve having a through passage; a port communicating with the through passage; and an annular passage at one side of the port.

3. The combination of a valve chest having two partitions therein spaced apart; a cylindrical valve casing extending from one partition to the other, one end of the casing extending beyond one of the partitions; two series of ports in the partition, one of a greater length than the other; a valve mounted in the casing and having a through passage; an annular port communicating with the through passage and located near one end of the valve; a wide annular passage not communicating with the interior of the valve so that when the valve is in one position the ports are closed and when in another position the ports are opened; and three passages are formed between the interior of the valve and the space exterior of the casing.

In testimony whereof, I have signed my name to this specification, in the presence of two subscribing witnesses.

WILLIAM S. HODGES.

Witnesses:
 Wm. A. Barr,
 Jos. H. Klein.

Copies of this patent may be obtained for five cents each, by addressing the "Commissioner of Patents, Washington, D. C."